Sept. 5, 1933.  W. J. WILLIAMS  1,925,220
POWER CONTROL SYSTEM AND SWITCH THEREFOR
Filed Oct. 27, 1930  4 Sheets-Sheet 1
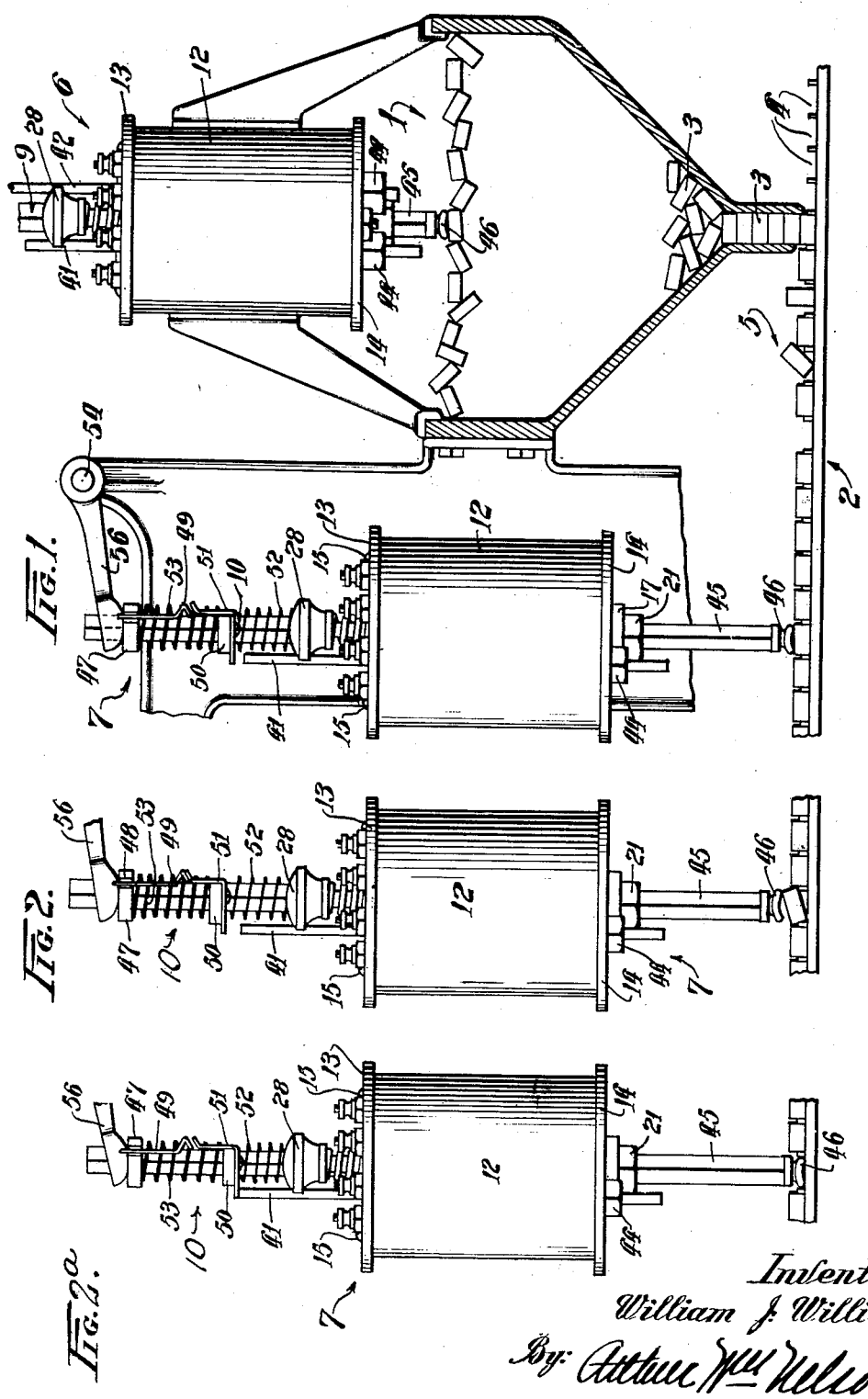

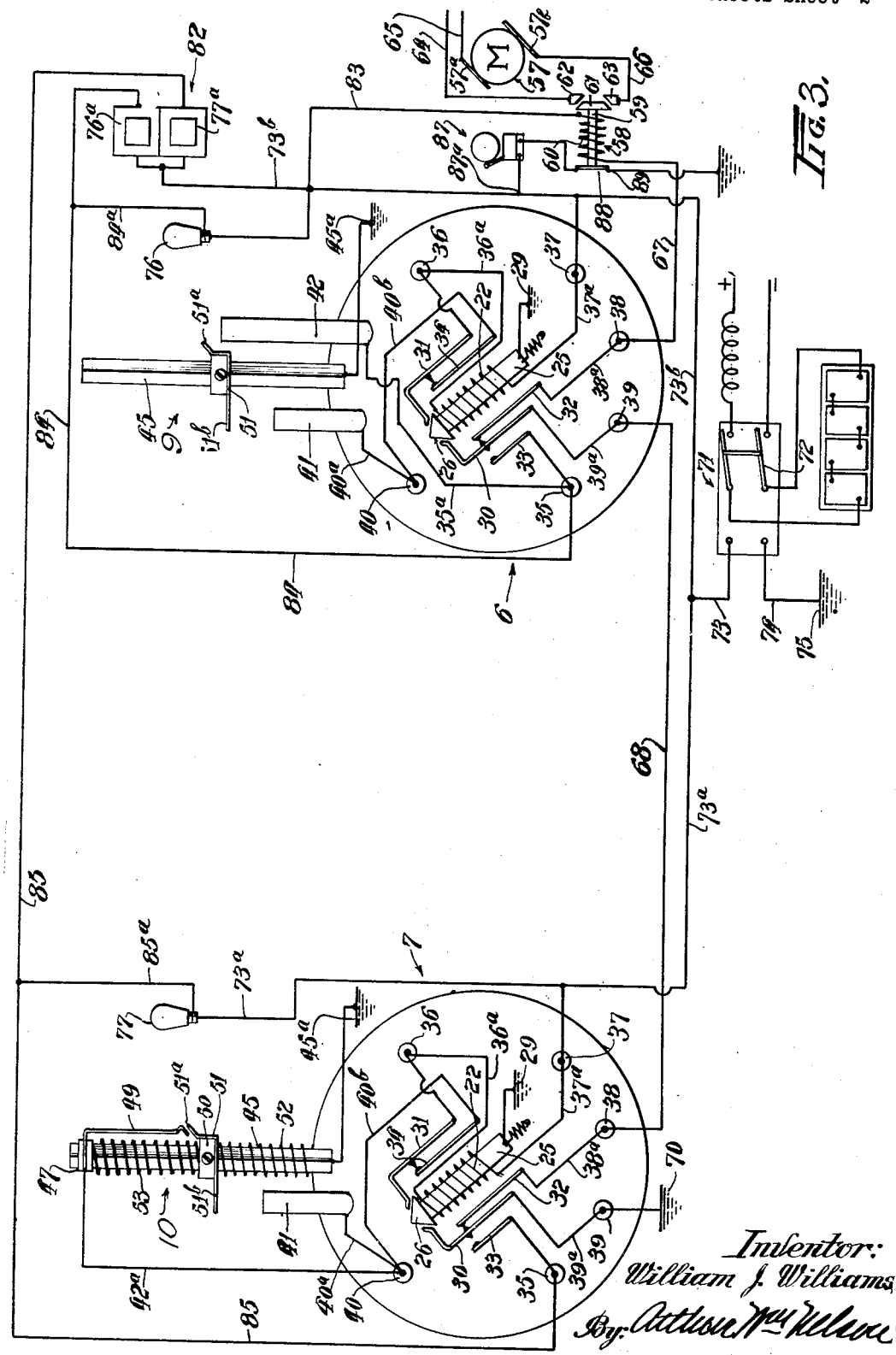

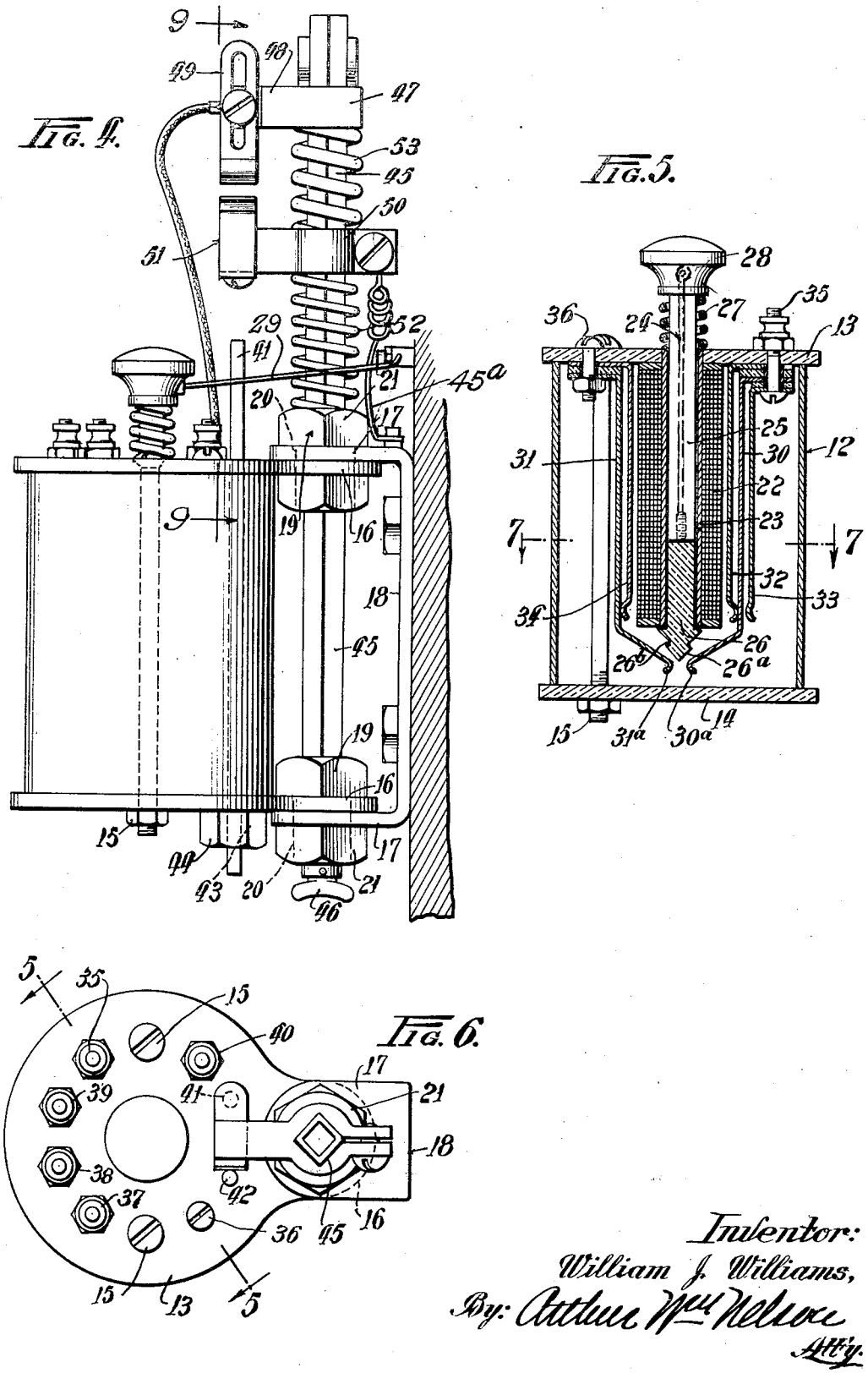

Sept. 5, 1933.   W. J. WILLIAMS   1,925,220
POWER CONTROL SYSTEM AND SWITCH THEREFOR
Filed Oct. 27, 1930   4 Sheets-Sheet 4
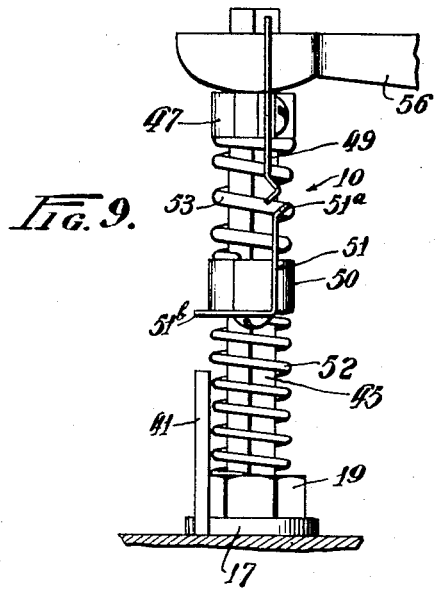
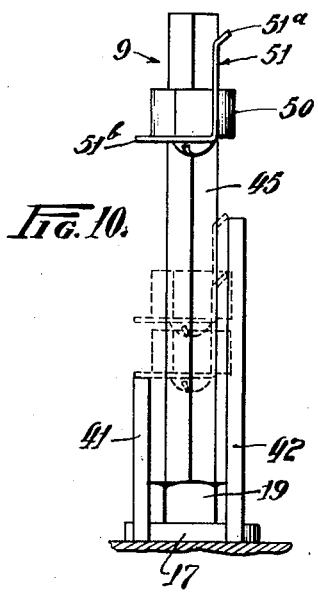
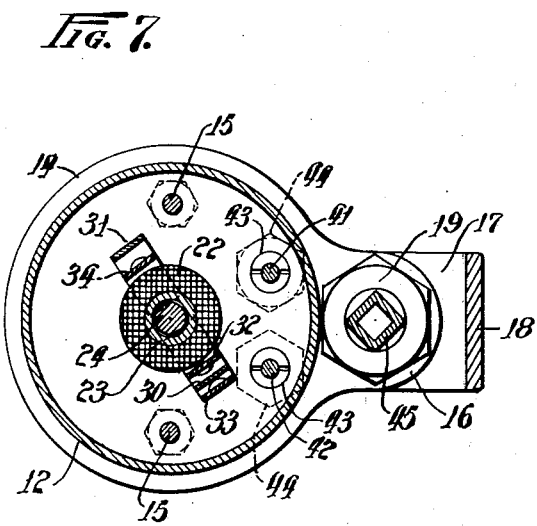
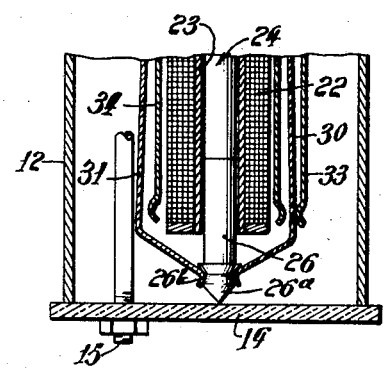
Inventor:
William J. Williams,
By: Arthur W. Nelson
Atty.

Patented Sept. 5, 1933

1,925,220

UNITED STATES PATENT OFFICE 1,925,220

POWER CONTROL SYSTEM AND SWITCH THEREFOR

William J. Williams, Chicago, Ill., assignor to Motor Devices, Inc., Chicago, Ill., a corporation of Illinois Application October 27, 1930. Serial No. 491,502

6 Claims. (Cl. 192—125)

This invention relates to improvements in power control systems and switch therefor and it consists of the matters hereinafter described and more particularly pointed out in the appended claims.

The primary object of the invention is to provide a system and switch therefor which is universal in its adaptation to many kinds of machines and operations, for automatically stopping said machines upon the occurrence of any abnormal condition in any one or more of the mechanisms thereof, whereby damage to the machine as well as faulty production is reduced to a minimum.

Another object of the invention is to provide a system and switch of this kind whereby accidental or intended restarting of the machine to which it is applied is impossible until any or all abnormal conditions which produced stopping are rectified and made normal and the switch is manually actuated to produce such restarting.

A further object of the invention is to provide a system and switch of this kind which immediately indicates both audibly and visibly, the location of the mechanism or part of the machine effected by the abnormal condition that produced the stopping of the machine.

The above mentioned objects of the invention as well as others, together with the many advantages thereof, will more fully appear as I proceed with my specification.

In the drawings:—

Fig. 1 is a view in side elevation of a part of a machine to which my improved system has been applied to stop the same upon the occurrence of any one of a number of abnormal conditions in any one of the mechanisms therein.

Figs. 2 and 2ª are views in elevation of one of the switch devices shown in Fig. 1, illustrating the feeler bar thereof in the positions operating to stop the associated machine under two different abnormal conditions.

Fig. 3 is a diagrammatic view of the system and switches employed in connection with the mechanisms of the machine part shown in Fig. 1.

Fig. 4 is a view in side elevation, on an enlarged scale over that shown in Fig. 1 of one of the switches shown therein and which will be more fully referred to later.

Fig. 5 is a vertical sectional view through the same as taken on the line 5—5 of Fig. 6.

Fig. 6 is a top plan view of the switch shown in Fig. 4.

Fig. 7 is a horizontal sectional view through the same on the line 7—7 of Fig. 5.

Fig. 8 is a fragmentary vertical sectional view similar to Fig. 5 with the parts shown in a changed position.

Fig. 9 is a vertical detail sectional view as taken on the line 9—9 of Fig. 4.

Fig. 10 is a view in front elevation of the feeler bar mechanism of the device when used for hopper conditions.

For the purpose of illustrating the utility of the invention, I have more or less conventionally shown in Fig. 1, the article supply hopper 1 and conveyor 2 of an automatic machine for wrapping small articles 3. The conveyor is formed to provide pockets 4 which as they pass beneath the hopper receives a single article 3 therefrom for delivery to the wrapping mechanism, not shown.

Should an article be deposited in a pocket in a tipped or crocked position as indicated at 5, it is apparent that difficulty would arise upon its introduction to the wrapping mechanism. Should there be a failure in the delivery of an article 3 from the hopper 1 into a conveyor pocket 4, so that an empty pocket is presented to the wrapping mechanism, it is apparent that such mechanism is quite liable to become jammed. Such a position of an article in a pocket, or the absence of such an article from a pocket may be termed "abnormal conditions" and their occurrences should either be rectified or the machine should be stopped to prevent any damage to subsequently acting mechanisms.

Should the hopper become depleted it is apparent that another abnormal condition arises which would warrant stopping the machine.

From the above, it is apparent, that in the machine above mentioned several abnormal conditions may arise wherein an instantaneous stopping of the machine would be advantageous to permit the correcting of such conditions.

In accordance with the invention, I provide a "feeler" or "detector" device at different parts of the machine which upon the occurrence of such an abnormal condition instantly stops the machine, preferably by breaking the circuit to the driving motor therefor. In Fig. 1 I have shown such a feeler or detector device 6 associated with the hopper to stop the machine upon depletion of the articles therein, and a second device 7 so mounted on the machine as to stop the same should an article 3 be placed upon the conveyor in a tipped position or should an empty pocket 4 in the conveyor pass therebeneath.

Both devices 6 and 7 are quite similar in construction, the only difference therebetween being in the associated feeler mechanism 9 and 10 respectively and the manner of their mounting in their respective positions.

Each device 6 and 7 is in fact a circuit controlling switch having peculiar characteristics and includes an upright tubular casing 12 closed at its ends by top and bottom end plates 13 and 14 respectively, the casing and end plates being secured together by a pair of diametrically opposite bolts 15. Each end plate is provided at its rear with an extension 16 and both extensions engage ears 17 on a U-shaped bracket 18 adapted to be secured to any suitable part of the machine for support therefrom. A tubular bolt or bushing 19 having a threaded shank 20 extends through each extension and ear mentioned and a nut 21 is screwed upon said shank in a manner securing said parts together.

Axially in the casing and supported by and depending from the top end plate 13 thereof, is a magnetic coil 22 embodying a center tube 23 in which is located a longitudinal armature stem and contact member 24. The top portion 25 of said stem is of magnetic material while the bottom end portion 26 thereof is of non-magnetic material. The bottom non-magnetic end of this stem has a tapered head 26ª that is formed to engage the coil end which limits its upward movement against the action of an expansion spring 27 surrounding a part of the magnetic end of the stem between a knob 28 thereon and the top end plate 13. This stem is grounded in any suitable manner to the frame of the machine with which the hopper 1 is associated as indicated at 29 in Figs. 3 and 4 and the head 26ª of its non-magnetic end is provided with an annular groove 26ᵇ.

Within the casing on diametrically opposite sides of the coil 22 and depending from the head 13 of said casing are contact members 30 and 31 each in the form of a laterally flexible member having its free ends 30ª—31ª bent to approach the axis of the stem 24, the extremities of said ends being bent outwardly as shown so that when the stem 24 is moved downwardly, its head 26ª will engage and spread said ends so that the groove 26ᵇ will engage between them. Associated with the contact member 30 are inner and outer contacts 32 and 33 respectively and associated with the contact member 31 is an inner contact 34. When the head of the stem is out of engagement with the contact parts 30ª—31ª, the contacts 32—34 are in engagement with the contact members 30 and 31 and when the head end 26ª of the stem is engaged with said contact parts 30ª—31ª, the contact members 30 and 31 are out of engagement with the contacts 32—34 but the contact 30 is in engagement with the contact 33.

The contact member 30 and associated contacts 32 and 33 are supported from the top end plate 13 by a binding post 35 but are all insulated from each other, the contact 33 however, being electrically connected to said post for the passage of current therethrough, the said post being adapted to have a conductor connected thereto in the usual manner for a purpose later to appear.

The contacts 31—34 are supported from the top end plate 13 by a bolt 36 but are suitably insulated from each other. The binding post 35 and the bolt 36 are disposed upon the circle of the bolts 15 before mentioned and also on said circle and secured in said top end plate are terminal binding posts 37, 38, 39 and 40 respectively. Also, on said circle between the bolt 36 and post 40 are adjustable contact stems 41 and 42 in the form of relatively long rod members which extend through both end plates 13—14. In the bottom end plate 14 and associated with each stem 41—42 is a headed split bushing 43 and on the bushing outside said end plate is a nut 44. When it is desired to adjust the position of either stem longitudinally it is only necessary to loosen the proper nut 44 after which the said stem may be manually shifted in the desired direction after which the nut 44 is again tightened to secure the stem in its newly adjusted position.

The top end of the coil 22 is connected to the terminal post 37 by a conductor 37ª while the bottom end of said coil is connected to the bolt 36 by a conductor 36ª, the bolt 36 being electrically connected to the contact member 31. The terminal post 38 is electrically connected to the contact member 32 by a conductor 38ª, the terminal post 39 is likewise connected to the contact 30 by a conductor 39ª and the terminal post 35 is connected to the contact member 33 as before mentioned. This post 35 is also electrically connected to the contact stem 42 by a conductor 35ª and the terminal post 40 is connected to the contact stem 41 and to the contact member 34 by the conductors 40ª and 40ᵇ respectively.

Slidable through the tubular bolt like bushings 19—19 is a rod 45 preferably of a rectangular cross section so that it cannot turn therein and on the bottom end of said rod is a feeler shoe or button 46. This shoe is adjustable with respect to the rod and is of a shape to meet the use to which it is put, and will have an exterior feeler surface to correspond with that of the article or device with which it is to be engaged for its intended purpose.

In the case of the switch 7 employed to stop the machine upon abnormal conditions of articles 3 upon the conveyor 2, there is secured to the top end of the rod 45, a collar 47 capable of a sliding movement on said rod and this collar has a forward extension 48 to which is secured for longitudinal adjustment, a slotted contact finger 49. This finger however, is suitably insulated from said collar. Clamped to said rod 45 is a collar 50 and a conductor connects said collar to the bracket 18 for grounding purposes as indicated at 45ª. To the collar 15 is secured a single contact 51 having an upright finger 51ª adapted to coact with the contact finger 49 under certain conditions, and a horizontal contact finger 51ᵇ adapted to coact with the contact stem 41 previously mentioned, under other conditions.

Surrounding the rod 45 between the collar 50 and the bushing 19 associated with the top plate of the switch, is a coiled expansion spring 52 and surrounding the rod between the collar 47 and 50 is a second coiled expansion spring 53. It will be noticed that the spring 53 is much heavier than the spring 52. In the cases of the switch that is associated with the conveyor at 7 the stem 42 which is only useful in the hopper control as will later appear, is removed and a flexible conductor 42ª is substituted in its place to connect the terminal post 40 with contact member 49.

In the machine with which the switch device 7 is employed is a rock shaft 54 which receives a rocking movement in timed relation with respect to the step by step movement of the conveyor 2. On said rock shaft is secured, one end of a rocker arm 56 and the free end of said rocker arm is forked to straddle its associated rod 45 thereon to engage upon the collar 47 thereon. In the rocking movement of said arm, a downward movement is imparted to the associated collar 47 and this through the heavy spring 53 and collar 50 is transmitted to the rod 45. In the downward movement of the rod 45, the spring 52 is compressed and acts by expansion to move the rod 45 upwardly during the upward swing of the associated rock arm whereby said rod receives a reciprocation in timed relation with the passage of the pockets 4 beneath said device 7.

It is apparent that from the above, in the reciprocation of the rod 45, the feeler button or shoe 46 is moved toward and away from the conveyor. If conditions of the articles on the conveyor are normal, said rod will move its full intended stroke but if an article is in a tipped position as it approaches the plane of the said feeler rod, it is apparent that the button 46 will engage said article which offers a resistance to the movement of the rod with the result that the rod stops in its movement. However, the arm 56 must move its full distance and with the rod 45 thus resisted in its movement, the heavier spring 53 is compressed as the collar 47 moves down on the rod with the result that the contact 49 makes engagement with the contact finger 51ª of the contact 51.

Should there be no article 3 in a pocket 4 of the conveyor 2 as said pocket moves into the plane of the rod 45 of said device 7, then it is apparent that the rod 45 is moved downwardly, further than normal as when the feeler button or shoe engages an article in a pocket 4 with the result that, the finger 51ᵇ is engaged with the stem 41 to make contact therewith, the contact fingers 49 and 51 remaining spaced apart and out of engagement with each other.

As is best shown in Fig. 1 the rod 45 of the device 6 thereof is gravity actuated and its descent is dependent upon the amount of articles in the hopper, the shoe 46 on said rod resting upon said articles. The rod 45 of the device 6 is therefore devoid of the collar 47 contact 49 and springs 52—53 and has clamped thereto only the collar 50 with its contact member 51 which as before mentioned carries contact 51ª—51ᵇ. The conductor 42ª is absent and the stem 42 is employed in its stead as best shown in Fig. 10.

The rod 45 under such conditions will be of a length greater than the depth of the hopper from its "full" to its "empty" levels. In adjusting the rod 45 for hopper work, with the hopper empty, the rod is brought down to its limit in the empty hopper and the collar 50 is loosened and slid down the rod until it engages the stem 41 when said collar is again tightened up on said rod. The rod 45 is lifted to a position so that its button or shoe 46 is disposed at that level in the hopper wherein said level is approaching "empty". This position is so gaged as to provide sufficient time for refilling before complete emptiness occurs because as will later appear an alarm is sounded at this time to warn the operator that complete emptiness is approaching. When this adjustment has been made, the stem 42 which is only employed upon a hopper device 6 in substitution for the conductor 42ª is then adjusted upwardly so that it will engage the contact finger 51ª at this time.

In Fig. 3 is illustrated the circuit of the system as applied to the machine shown in Fig. 1 and in said Fig. 3, 57 indicates the motor for driving the various mechanism of the said machine. 58 indicates an electro-magnetic switch for controlling said motor which switch includes a solenoid core 59 and coil 60. One end of said core is formed as a contact 61 to bridge and connect coacting spaced contacts 62 and 63 respectively. The contact 62 is connected to the input line of a pair of service conductors 64 and 65 respectively, the latter being connected to one of the brushes 57ª of said motor 57. A line 66 connects the contact 63 with the other brush 57ᵇ of said motor. From the above, it is apparent that when the coil 60 is energized the switch acts to close the circuit to the motor and when said coil is deenergized, the motor stops.

One end of the coil 60 is connected to a terminal post 38 of the device or switch 6 by a conductor 67 and the terminal 39 of the same device or switch is connected to the terminal post 38 of the other device 7 by a conductor 68 while the terminal 39 of said device 7 is grounded as at 70.

71 indicates a source of current supply including a switch 72 for controlling the passage of current to the lines 73 and 74 the latter being grounded as at 75 and the line 73 having branches 73ª, 73ᵇ connected thereto. I provide in connection with the system a plurality of signal devices 76 and 77 in the form of lamps, one arranged near each device 6 and 7 and other signal devices 76ª and 77ª respectively in the form of drops in an annunciator 82 located at a point remote from the machine, as for instance near the desk of a supervisor or other person in authority who should be notified of any abnormal condition that arises in said machine.

There is an annunciator drop 76ª and 77ª respectively, one for each lamp 76 and 77 and one side of both drops is suitably connected to the branch 73ᵇ to which the other side of the coil 60 is likewise connected as at 83. The other side of each drop is connected to the binding post 35 of its associated device as by the conductors 84, and 85 respectively. The lamps 76 and 77 have their center contacts connected to the lines 73ᵇ and 73ª respectively, while their shell contacts are connected by the conductors 84ª and 85ª respectively, to said conductors 84 and 85 before mentioned. It is advisable to have an audible signal arranged near the motor 57 and its associated switch, which upon the happening of an abnormal condition in those parts of the machine with which the devices 6 and 7 are associated, sounds a signal or alarm. In this instance, said signal is in the form of a bell 87 one side of which is connected as at 87ª with the branch 73ᵇ and the other side of which is connected to a switch lever 88 so arranged with respect to the core 59 of the magnetic switch 58 that when said switch 58 is open, the switch lever 88 is engaged with a grounded contact 89 to complete the circuit through the bell to energize the same. When the contact 61 of the switch 58 is closed so as to bridge the contacts 62—63 said switch lever is out of engagement with said grounded contact.

Assume now that all machine conditions are normal and it is desired to start the machine. The main switch 72 is closed and this supplies current to the line 73 and branches 73ª, 73ᵇ. The current then passes from branch 73ᵇ through conductor 83 to coil 60 and through the same to terminal post 38 of the device 6 by way of conductor 67. From post 38 current passes through conductor 38ª to contact 32, finger 30 to post 39, thence through conductor 68 to post 38 of device 7 and through parts thereof similar to those just above mentioned to post 39 to ground 70.

This energizes the coil 60, the core of which moves longitudinally so that its contact 61 bridges contacts 62—63 and connects up the power lines 64—65 with the motor which starts running. In this closing of the switch 58, the switch lever 88 moves away from the ground contact 89 so that the circuit to the bell 87 is open. In the operation of the machine, an article is fed from the hopper 1 into a pocket 4 on the conveyor 2 and in the course of time the supply of articles therein become diminished unless replenished. As this supply diminishes, the rod 45 of the device 6 will descend with the level of said articles and when that level is approached wherein replenishing is necessary to prevent a complete emptying thereof, the free end of the contact finger 51 of the device 6 will engage the stem 42 of said device 6. This will close the circuit from the associated rod 45 (which is grounded at 45ª) through the contact 51ª, rod 42, conductor 35ª to post 35, through conductor 84 to one side of the annunciator drop 76ª out the other side thereof to the branch 73ᵇ. As the shell contact of the lamp 76 is connected to the conductor 84 (by line 84ª) and its center contact is connected to the branch 73ᵇ, it is apparent that the annunciator drop 76ª and lamp 76 are energized to provide a visible signal at the device 6 and another one at a point remote therefrom so that the attendant is notified that the hopper requires replenishing.

If this is done immediately the rod 45 of the device 6 is lifted upwardly so that its feeler or shoe rest upon the top of the replenished supply. In this upwardly lift of the rod, the contact 51ª leaves the stem 42 and the circuit to the annunciator drop 76ª and lamp 76 is broken and they immediately become inoperative.

Assume that the attendant for some reason or other has failed to replenish the hopper upon the warning signal thus given. As the supply diminishes toward complete emptiness, the rod 45 descends still further with the contact 51ª sliding along the side of the stem 42. All this while the lamp 76 and drop 76ª are still functioning for their intended purpose. When the rod 45 has descended to the level wherein the contact 51ᵇ engages the stem 41, current passes through the branch 73ᵇ, to post 37, through conductor 37ª coil 22 and conductor 36ª to post 36. From this post it passes through finger 31, contact member 34, conductor 40ᵇ to post 40 and from there through conductor 40ª to stem 41, contact finger 51ᵇ (which is in contact with said stem as before mentioned) to rod 45 and ground 45ª. This energizes the coil 22 and projects the core so that its tapered head 26ª enters between the ends 30ª and 31ª of the contact fingers 30 and 31 and spreads them apart, the groove 26ᵇ having a snap locking action with said contact finger ends as best shown in Fig. 8. As the contact fingers 30 and 31 are thus spread apart, the contact finger 31 breaks engagement with the contact member 34 and the contact finger 30 breaks engagement with the contact member 32 and makes engagement with the contact member 33. It is pointed out at this time that although the spring 27 is relatively strong it is not strong enough to overcome the restraining action of the coil 22 and the engagement of the groove 26ᵇ by the contact finger ends 30ª—30ᵇ.

With the parts in this position and especially with the contact finger 30 out of engagement with the contact member 32, one end of the coil 60 (though the conductor 67, post 38, conductor 38ª and contact member 32) is disconnected from the source of current supply and become deenergized. Under this condition, the core 59 is retracted and this removes the contact 61 from bridging engagement from the contacts 62—63 to deenergize and stop the motor 57 that drives the machine. In this retracted movement of the core, its opposite end causes the switch lever 88 to close against the ground contact 89 to energize the bell 87 which sounds its alarm. Under these conditions the machine (through the motor 57) is stopped, the bell 87 is ringing and the lamp 76 and annunciator 76ª are still functioning. To restart the machine, the hopper must first be replenished, the rod 45 then lifted up to bring its feeler or shoe on top of the articles in the hopper after which the knob 28 is grasped and manually lifted upwardly to break engagement of the head 26ª with the ends 30ª—31ª of the contacts 30 and 31 which now spring or yield inwardly to again engage the contact members 32—34, the contact finger 30 breaking contact with the member 33. This again energizes the switch 58 to close the circuit to the motor which again starts to run as before, thus again putting the machine in operation.

Assume now that an article 3 occupies a tipped position in a conveyor pocket 4 and that the collar 50 of the device 7 has been properly adjusted upon the rod 50 and the contact finger 49 of the same device has been properly adjusted with respect to the collar 47 to meet such a contingency. As the associated arm 56 of the machine swings downward it will through the spring 53 impart a downward movement to the rod 45 compressing the spring 52. Upon the feeler or shoe 46 meeting the tipped article, the movement of the rod 45 is arrested with the result that the collar 47 moves relatively to the rod and compresses the spring 52 and engages the contact 49 with the contact finger 51ª.

Under such a condition, current passes from the line 73 to post 37, conductor 37ª through the coil 22, conductor 36ª, post 36, contact fingers 31, 34, conductor 40ᵇ, post 40, conductor 42ª, finger 49, finger 51ª, rod 45 to ground 45ª. This energizes the coil 22, and causes its associated core 24 to move outwardly against the action of the spring 27 so that the head 26 engages the ends 30ª—31ª of the contact fingers 30—31. This breaks contact between the finger 31 and contact member 34 and breaks contact between the finger 30 and contact member 32 and causes said last mentioned finger to engage contact 34. This closes the circuit through the line 85—85ª whereby the lamp 77 is energized and the annunciator drop 77ª is likewise energized. By reason of the breaking of the contacts 30—32 it is apparent that the connection to the ground 70 for the line 68 is broken whereby the supply of current to the coil 60 is broken so that it is deenergized and the bridge piece 61 breaks contact with the contacts 62—63 to stop the motor. The switch 58 then acts to close the circuit to the bell as before described, so that not only is an audible signal given but a visible one is also given upon the occurrence of an abnormal condition which in this instance is the tipped article on the conveyor.

Should an article 3 be standing on its end in a pocket 4 of the conveyor as shown in the third filled pocket from the right as shown in Fig. 1 instead of being in the tipped position previously mentioned, the shoe 46 of the rod 45 will engage the top end of said article. This will arrest the movement of the rod 45 with the result that the collar 47 moves relatively to the rod and compresses the spring 52 and engages the contact 49 with the contact finger 51ᵃ. The passage of the current will then be as above described to actuate the drop 77ᵃ, the lamp 77, the bell 87 and the switch 58 all as before described, when said shoe 46 engages the tipped article 3 in one of the conveyor pockets.

After this normal condition has been rectified, the knob 28 is lifted upwardly to return all parts of the switch to operating positions and the motor again starts.

Assume now that there has been a failure in the feeding of an article 3 from the hopper 1 to a pocket 4 in the conveyor. This empty pocket will move toward the device 7 and when in line therewith, the rod 45 of said device moves downwardly further than it would if a proper article was in the pocket (without engaging contacts 49—51ᵃ) until the contact finger 51ᵇ engages the top of the stem 41. This will connect the stem 41 with the ground 45ᵃ of said device whereby current would pass from the line 73ᵃ to the coil 22, conductor 36ᵃ, post 36, contacts 31—34, conductors 40ᵇ to post 40, conductor 40ᵃ to stem 41, to ground 45ᵃ through contact 51ᵇ and the rod 45.

This will energize the coil 22 which projects its core to spread the contacts 30—31 as before to break contact between contacts 31—34 and between contacts 30 and 32 and make contact between contacts 30 and 33. This breaks the connection to the ground 70 for the lines 68 and 67 to deenergize the switch 58 and stop the motor 57 and at the same time passes current through the lines 85—85ᵃ to energize the lamp 77 and annunciator drop 77ᵃ as well as to energize the bell 87. Thus an empty pocket passing beneath the device 7, stops the machine and produces the visual and audible signals as is apparent.

After an article has been manually placed in the empty pocket, the knob 28 of the device is actuated to reset said device and the machine again starts operating.

From the above, it is apparent that any operating condition other than normal produces a stopping of the machine as well as signal indicating such an abnormal condition and a second signal disclosing the approximate position of such an abnormal condition.

Thus the switch device mentioned is universal in effect and permits the addition of other devices to the same machine for other abnormal conditions, it only being necessary to provide the ground 70 in the last device of the system. Thus in adding other devices to the system described, this can be done by placing them between the device 6 and 7.

The device by which the system is made possible is fully adjustable to meet any condition which is abnormal to a predetermined normal condition. Such a device is simple in construction, is positive and is easily assembled as well as wired into the system with which it is associated.

While in describing the invention, I have referred in detail to the form and arrangement of the parts thereof as well as to the manner of wiring, the same is to be considered merely as illustrative so that I do not wish to be limited thereto except as is specifically set forth in the appended claims.

I claim as my invention:—

1. A power control system embodying therein, in combination with a machine including a plurality of mechanisms having normal operating conditions, means for driving said machine, means for controlling said driving means, a signal device associated with each mechanism another signal device common to all of said mechanisms and means associated with each mechanism and operative upon the occurrence of an abnormal condition at the associated mechanism to actuate the associated signal device and the signal device common to all of said mechanisms, one of said means operating to actuate said signals previous to stopping the machine and the other of said means operating to simultaneously actuate said signals and to so act upon the controlling means for said driving means as to stop the machine.

2. A power control system embodying therein, in combination with a machine including a plurality of mechanisms having normal operating conditions, a motor for driving said machine, a switch for controlling said motor, a signal device associated with each mechanism, another signal device common to all of said mechanisms and operative upon the occurrence of an abnormal condition at the associated mechanism to actuate the associated signal device together with signal device common to all of said mechanisms and to cause said switch to stop said motor, one of said means operating to actuate said signals previous to actuating the switch to stop the motor, the other of said means operating to simultaneously actuate said signals and said switch to stop the motor.

3. A power control system embodying therein, in combination with a machine including a plurality of mechanisms having normal operating conditions, a motor for driving said machine, an electro-magnetic switch including a coil for controlling said motor, a source of current supply connected to one end of said coil and a device associated with each mechanism and including parts connected in series and providing a ground connection for the other end of the coil, each device operating upon the occurrence of an abnormal condition at its associated mechanism to break said series ground connection through its own associated parts to cause said switch to stop the motor.

4. A power control system embodying therein, in combination with a machine including a plurality of mechanisms having normal operating conditions, a motor for driving said machine, an electro-magnetic switch including a coil for controlling said motor, a source of current supply connected to one end of said coil, a device associated with each mechanism and including parts connected in series and providing a ground connection for the other end of the coil and a signal member associated with each device and connected at one side to said source of current supply, each device operating upon the occurrence of an abnormal condition at its associated mechanism to break said series ground connection for the coil and to make a ground connection for the other side of said signal member to actuate the same and to cause said switch to stop the motor.

5. A power control system embodying therein, in combination with a machine including a plurality of mechanisms having normal operating conditions, a motor for driving said machine, an electro-magnetic switch including a coil for controlling said motor, a source of current supply connected to one end of said coil and a device associated with each mechanism and including parts connected in series and providing a ground connection for the other end of the coil, each device operating upon the occurrence of an abnormal condition at its associated mechanism to break said series ground connection through its own associated parts to cause said switch to stop the motor, each device including a manually operable member for restoring said series ground connection.

6. A power control system embodying therein, in combination with a machine including a plurality of mechanisms having normal operating conditions, a motor for driving said machine, an electro-magnetic switch including a coil for controlling said motor, a source of current supply connected to one end of said coil, a device associated with each mechanism and including parts connected in series and providing a ground connection for the other end of the coil and a signal member associated with each device and connected at one side of said source of current supply, each device operating upon the occurrence of an abnormal condition at its associated mechanism to break said series ground connection for the coil and to make a ground connection for the signal member and for breaking the ground connection for the other side of said signal member.

WILLIAM J. WILLIAMS.